Feb. 25, 1930.                 H. P. MERRIAM                     1,748,577
                          METHOD OF FORMING TANK ENDS
                              Filed Sept. 7, 1928
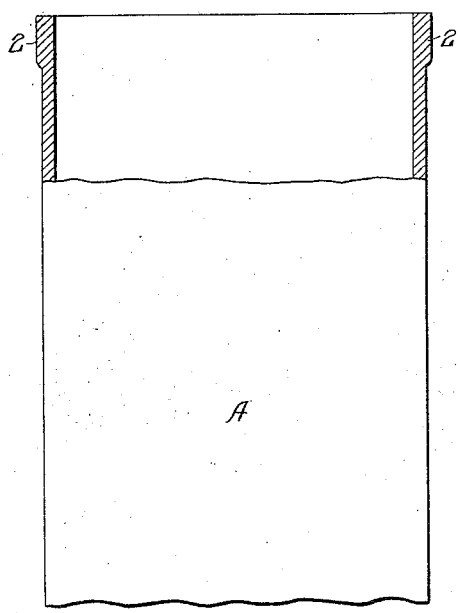
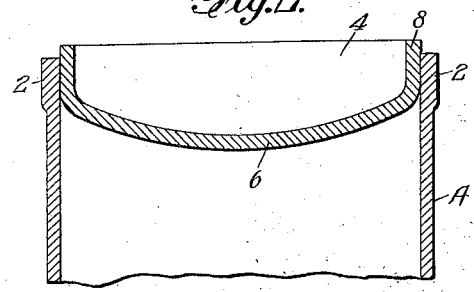
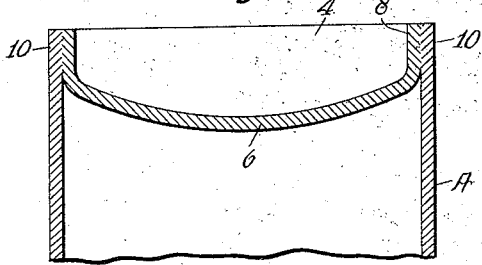
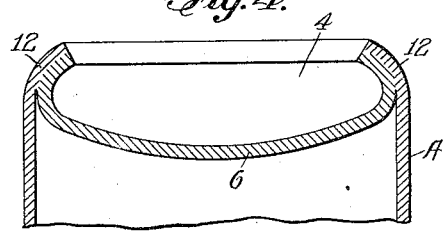
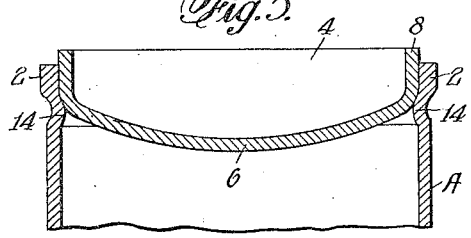
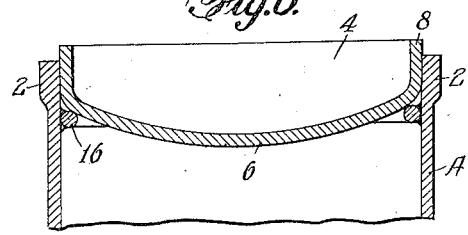
Inventor
Henry P. Merriam
By his Attorney

Patented Feb. 25, 1930

1,748,577

UNITED STATES PATENT OFFICE

HENRY P. MERRIAM, OF CARBONDALE, PENNSYLVANIA, ASSIGNOR TO AMERICAN WELDING COMPANY, OF NEW YORK, N. Y., A CORPORATION OF DELAWARE

METHOD OF FORMING TANK ENDS

Application filed September 7, 1928. Serial No. 304,421.

This invention relates generally to containers or tanks used for transporting gases under high pressure, such as acetylene. Tanks of the kind just mentioned are usually handled by being rolled on the edge of the bottom thereof, and it is therefore necessary to provide a bottom construction which is strong enough to resist distortion which might occur from continued handling. The tanks are usually provided with a concave head inset in the end of a cylindrical shell and welded to the shell either by pressure or electric welding, but the necessary compression of the metal, due to the action of the rollers or other pressure means employed to secure a pressure weld, often times results in a reduction in thickness of the shell at the end thereof thus correspondingly reducing the strength of the finished tank and rendering the same liable to distortion after a short use thereof.

One object of the present invention is to provide a tank for holding gas under pressure, which tank has its lower end reinforced to provide additional strength.

A further object of the invention is the provision of a tank in which the thickness of the metal at the end of the tank shell is not less than that of the body of the shell or the remaining portion thereof.

Another object of the invention is the provision of a tank having a head welded in one end thereof.

A still further object of the invention is the provision of a method of forming an end closure for a tank or the like.

Other objects and advantages of this invention will be apparent from the following description, taken in conjunction with the accompanying drawings, in which:

Figure 1 is a side elevation of a part of a tank shell, the end thereof being shown in section and having its edge upset;

Fig. 2 is a sectional view of the end of the tank shown in Fig. 1 showing the head or end closure in position;

Fig. 3 is a sectional view of the tank end shown in Fig. 2 after the head has been welded to the shell;

Fig. 4 is a sectional view of the finished tank; and

Figs. 5 and 6 are sectional views similar to Fig. 2 but showing modifications of the tank end.

Referring now more particularly to the drawings. Figs. 1 to 4 inclusive, while showing the construction of the tank, also disclose successive steps in the manufacture thereof, and during this description the specific construction of the tank will be pointed out in connection with the description of the method of manufacturing the tank.

In forming the tank of the present invention, more particularly, forming the end and the end closure thereof, a cylindrical shell A of suitable metal is provided, and the end thereof is preferably upset, as shown at 2, thus forming a thickened portion at the end. This thickened portion is formed of a width sufficient for a subsequent pressure weld, as will be hereafter described, and any preferred or desired method for upsetting the end of the shell may be employed, but usually the shell end is first heated and then upset by rollers which will preserve the internal diameter of the shell while upsetting or thickening the end thereof.

Next, a head 4 is inserted in the end of the shell A, as shown clearly in Fig. 2; the head being concave or dish-shaped and having a base 6 and an annular flange 8, which latter is engaged in contact with the interior surface of the shell at the upset portion 2 thereof. As clearly shown in Fig. 2, the head 4 is inserted only partially into the shell, and a portion of the flange 8 protrudes or extends beyond the edge of the shell A for a purpose presently to be described.

The tank end with its associated head 4, assembled as shown in Fig. 2, is then heated to a welding temperature, and by suitable pressure means, such as rollers or the like, the upset shell end 2 and the flange 8 of the head are welded together, the pressure employed reducing the upset end to the original thickness of the shell, as clearly shown at 10 in Fig. 3; the welding operation bringing the upper edges of the head 4 and the shell A into horizontal alinement.

As the final step in the method of forming the tank end, the end of the tank shell with the flange 8 of its welded end closure is then inwardly crimped or flanged as shown at 12 in Fig. 4; it usually being necessary to re-heat the tank end to accomplish this crimping, but any preferred or desired method may be employed.

Figs. 5 and 6 disclose modifications in which in Fig. 5 an internal bead 14 is pressed from the shell A either during the upsetting operation, prior thereto or subsequent thereto; said bead 14 serving as a shoulder to limit the insetting of the end closure or head 4 in the shell. After the head 4 and shell A, shown in Fig. 5, have been welded together in a manner similar to that shown in Figs. 2 and 3, the tank shell end with its associated end closure flange is then crimped in a manner similar to that shown in Fig. 4, and it will be apparent that the head 4 of Fig. 5 will be positively wedged between the end of shell A and the shoulder 14, thus firmly securing the head at its base even in the event of a defective weld of the flange 8 and shell A.

In the modification shown in Fig. 6, a shoulder is also provided, but in this instance, the shoulder comprises an annular metallic ring 16 which is electrically welded to the interior of the shell adjacent the rear of the upset end 2; the shoulder formed by the ring 16 functioning as does the bead 14 shown in Fig. 5.

It is believed that the construction of this tank end will be fully apparent to those skilled in the art, attention being called to the fact that by this construction the end of the tank has the shell portion thereof of the same thickness as the remaining portions of the shell, thereby strengthening the end of the tank to this extent in contradistinction to a construction in which the tank end is reduced in thickness where it engages over the end closure, as is usual in tanks of the present day.

The drawings disclose the preferred embodiment of the invention, but it is to be understood that they are for illustrative purposes only, and that various changes in the form and proportions of the device may be made within the scope of the appended claims without departing from the spirit of the invention.

What is claimed is:

1. The method of forming a tank end which comprises upsetting the end of a cylindrical metallic shell, and welding a head in the said end by pressure to reduce the upset portion of the shell to substantially its original thickness.

2. The method of forming a tank end which comprises heating one end of a cylindrical metallic shell, upsetting said heated end, welding a head in the shell at the upset end thereof, and finally bending the tank end and head inwardly to crimp said end over the head.

3. The method of forming a tank end which comprises upsetting the end of a cylindrical metallic shell, inserting a dish shaped head in said upset end with the annular flange thereof protruding beyond the end of said shell, heating the tank end to a welding temperature, welding the tank end to the flange of the head by pressure to elongate the shell whereby the upset portion of the end is reduced to its original thickness, and finally bending the shell end and flange inwardly to crimp said end over the head.

4. The method of forming a tank end which comprises upsetting the end of a cylindrical metallic shell, forming a shoulder on the interior of the shell adjacent the upset portion, inserting a head in the upset end to contact with the shoulder, heating the assembled shell end and head to welding temperature, and finally welding said shell end and head together.

5. The method of forming a tank end which comprises upsetting the end of a cylindrical metallic shell, forming a shoulder on the interior of the shell adjacent the upset portion, inserting a head in the upset end to contact with the shoulder, heating the assembled shell end and head to welding temperature, and finally welding the head and upset end together by pressure to reduce the upset portion to substantially its original thickness.

6. The method of forming a tank end which comprises upsetting the end of a cylindrical metallic shell, forming a shoulder on the interior of the shell adjacent the upset portion, inserting a head in the upset end to contact with the shoulder, heating the assembled shell end and head to welding temperature, welding the head and upset end together by pressure to reduce the upset portion to substantially its original thickness, and finally crimping the end of the shell over the head.

In witness whereof I have hereunto set my hand.

HENRY P. MERRIAM.